H. Z. COBB.
VEHICLE TIRE.
APPLICATION FILED JULY 17, 1914.
1,210,048.
Patented Dec. 26, 1916.
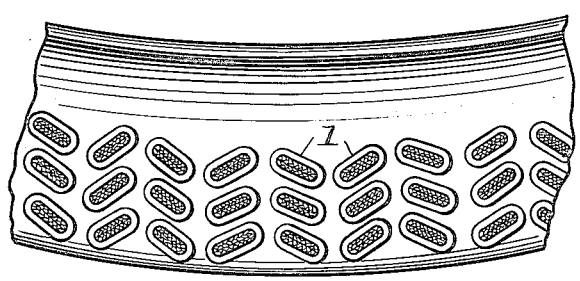
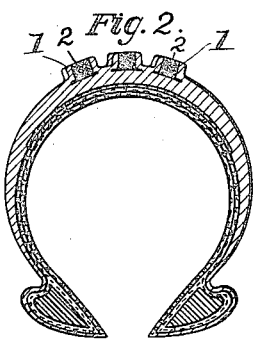
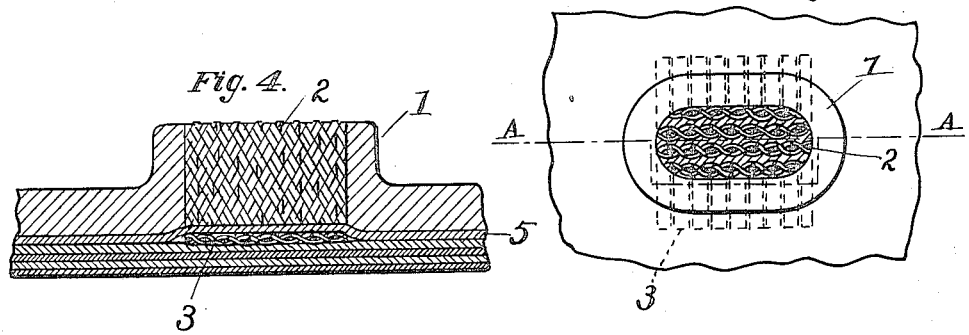
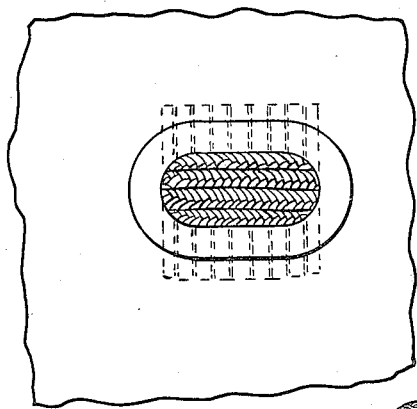
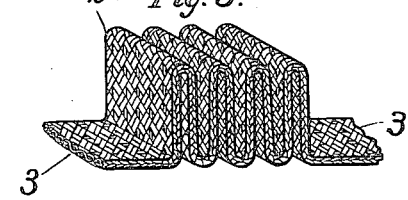
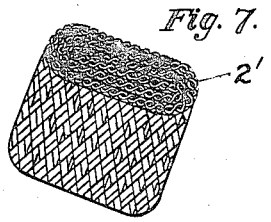
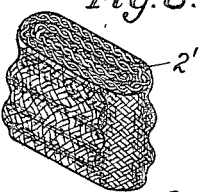
Witnesses:
Edw. W. Vaill
B. V. Mohan.
Inventor:
Henry Z. Cobb.
by Ernest Hopkinson
his Attorney

UNITED STATES PATENT OFFICE.

HENRY Z. COBB, OF WINCHESTER, MASSACHUSETTS, ASSIGNOR TO REVERE RUBBER COMPANY, A CORPORATION OF RHODE ISLAND.

VEHICLE-TIRE.

1,210,048.　　　　　Specification of Letters Patent.　　Patented Dec. 26, 1916.

Application filed July 17, 1914. Serial No. 851,438.

*To all whom it may concern:*

Be it known that I, HENRY Z. COBB, a citizen of the United States, residing in Winchester, county of Middlesex, and State of Massachusetts, have invented certain new and useful Improvements in Vehicle-Tires, of which the following is a full, clear, and exact disclosure.

My invention relates particularly to vehicle tires made of elastic material, and is more particularly applicable to rubber or elastic tires of the pneumatic type.

The object of my invention is to embody in a tire a material which will not only increase the wearing qualities of the tire, but will also produce an antiskidding or antislipping effect.

Broadly, my invention comprises embedding in the projecting lugs of non-skid tire casings, cores or plugs made of a composite fabric comprising strands of fibrous material interbraided or interwoven with strands of metal in the form of wire or wire filaments so as to rigidly hold said wires in position within the material of the tire.

A further feature of my invention comprises such a disposition of the material within the tread portion of the tire that the wire will be presented to the road surface at a substantially right angle to the same so that the ends of the wires will form sharp burs which increase the frictional resistance between the road surface and the tire and in conjunction with the action of studs or lugs prevent skidding or slipping to a much greater extent.

This form of my invention is a particular adaptation of my invention described in an application filed by me in the United States Patent Office on June 20, 1914, Serial No. 846,245, and relates particularly to tires now on the market having projecting studs of rubber arranged on the tread portion for producing antiskidding or antislipping action.

For a detailed description of one form of my invention reference may be had to the following specification and to the accompanying drawings forming a part thereof, in which:

Figure 1 is a perspective view of a portion of a tire having my improved antiskidding plugs embodied therein; Fig. 2 is a transverse sectional view of the same; Fig. 3 is a perspective view of one of the cores of the studs showing the method by which they are formed; Fig. 4 is a transverse sectional view taken substantially on the line A—A, Fig. 6, showing the core inserted in one of the studs on the tread portion of a tire; Fig. 5 is a plan view of the same before the outer surface of the stud and core is worn away; Fig. 6 is a plan view of the same, showing the effect of wear on the outer surface of the stud and core; Fig. 7 is a perspective view showing another method of forming the core; and Fig. 8 is a perspective view showing the method of roughening the cores to give a stronger connection with the rubber of the tread.

Referring to Figs. 1 and 2, it will be seen that the tire casing is in the usual form and is provided with successive series of inclined elongated studs 1, this being a well known form of tire now on the market. In my improved construction, the centers of these studs are provided with cores 2 made up of a composite material consisting of wire strands and interlaced fibrous strands treated with rubber to firmly anchor the wires in position. This material comprises a composite fabric which is preferably manufactured in accordance with the description set forth in my application filed in the United States Patent Office on June 20, 1914, Serial No. 846,245. It consists in the main of longitudinal warp strands of wire, either single wires or a series of braided or twisted wire filaments which are preferably covered or wound with fibrous threads to form strands similar to those known in the electrical art as insulated wire. These wire strands are interwoven or braided with transversely extending fibrous strands which make up the composite fabric referred to. These cores may be made in a number of different ways, one of which is indicated in Fig. 3, in which the strips of the fabric, preferably impregnated with rubber, are crimped in successive layers and then forced together so as to form a substantially solid block 2 having projecting flanges or lips 3. These blocks 2 are preferably inserted through corresponding holes in the so-called breaker strip 5 of the tire carcass and then inserted in the openings in the studs 1, after which all the parts are cured or vulcanized in position on the tire carcass. By reason of the fact that the breaker strip 5 passes about the flanges or lips 3, the studs are not only held firmly in position on the carcass, but the tread portion of the tire is more firmly united with the said carcass.

As shown in Fig. 7, the fabric instead of being crimped into form, may be rolled spirally into the desired shape, either with or without extending flanges or lips, but when the latter are not used, the studs of the blocks may be roughened or fluted, as indicated in Fig. 8, so as to give a stronger connection between the rubber of the studs and said cores or blocks. It will now be seen that by reason of the fact that the wires of the fabric extend at right angles to the surface of the tread, the wearing of the studs will be greatly increased which, of course, is aided to a large extent by reason of the fact that connecting strands of fibrous yarn are also presented endwise to the road surface. Both of these materials have much greater wearing qualities than that of the rubber itself. The wire strands being interwoven with the fibrous strands and firmly united therewith by the rubber with which the fabric is impregnated, there will be practically no possibility of the wires being displaced or pulled out, while at the same time the core is rigidly held in position and prevented from becoming loosened by the great strains to which such studs are subjected during travel of the automobile over the road surface. Furthermore, the antiskidding action of the studs is many times increased because the outer ends of the wires will protrude slightly beyond the rubber and so directly engage the road surface, especially on very smooth and slippery pavement, such as asphalt, concrete, etc. Thus it will be seen that an antiskidding action is produced which is effective on different sorts of road surfaces, the studs themselves acting where the surface is somewhat soft and slippery, while the wires of the cores act where the surface is slippery but hard and smooth.

Having thus described this form of my invention, what I claim, to protect by Letters Patent is:

In a vehicle tire, the combination with a series of projecting studs or lugs, cores for said studs radially disposed therein comprising a composite material having successive layers of intimately interwoven fibrous transverse binding strands and wire, said layers being bent to form laterally projecting flanges at the bases of said cores and projecting beneath the bases of said studs within the material of the tire.

Signed at Chelsea State of Mass. this 7th day of July 1914.

HENRY Z. COBB.

Witnesses:
WILLIAM H. GLEASON,
EDWIN L. STICKNEY.